United States Patent [19]

Ogino et al.

[11] Patent Number: 5,031,830
[45] Date of Patent: Jul. 16, 1991

[54] APPARATUS FOR COMPUTING RECOGNIZED VALUE OF AMOUNT OF SOLAR RADIATION IN AUTOMOBILE AIR-CONDITIONING SYSTEM

[75] Inventors: Kou Ogino, Tokyo, Japan; Kouji Murayama; John Petersdorf, both of Phoenix, Ariz.

[73] Assignee: Calsonic Corporation, Tokyo, Japan

[21] Appl. No.: 371,539

[22] Filed: Jun. 26, 1989

[30] Foreign Application Priority Data

Jun. 27, 1988 [JP] Japan ................. 63-156999

[51] Int. Cl.$^5$ ............................................ G05D 23/00
[52] U.S. Cl. ..................... 236/91 C; 62/229; 165/43
[58] Field of Search ............. 236/91 C; 62/229, 208; 165/43

[56] References Cited

U.S. PATENT DOCUMENTS 4,696,167 9/1987 Matsui .......................... 62/180

FOREIGN PATENT DOCUMENTS 0082623 7/1981 Japan ............................ 236/91 C
0034915 2/1984 Japan ............................ 236/91 C Primary Examiner—William E. Wayner
Attorney, Agent, or Firm—Gordon W. Hueschen

[57] ABSTRACT

This invention concerns an apparatus for computing a recognized value as one of the control elements for an automobile air-conditioning system, which apparatus performs the computation of the recognized value by a procedure which comprises detecting an amount of solar radiation with the aid of solar radiation amount detection means, forming a decision as to the trend of variation of the amount of solar radiation with the aid of comparison means, and performing an operation of integration of a recognized value of the amount of solar radiation with the aid of arithmetic operation means by using a relatively small time constant when the decision is that the amount of solar radiation is on the upward trend or a relatively large time constant when the decision is the opposite. The air conditioning, therefore, is controlled so as to follow the variation in the amount of solar radiation when this amount is on the upward trend or to remain in the present status when the amount is on the downward trend. The control effected in this manner enables the occupants of an automobile to enjoy highly satisfactory feeling of air conditioning.

5 Claims, 4 Drawing Sheets

APPARATUS FOR COMPUTING RECOGNIZED VALUE OF AMOUNT OF SOLAR RADIATION IN AUTOMOBILE AIR-CONDITIONING SYSTEM

BACKGROUND OF THE INVENTION

1. Field of the Invention

This invention relates to an apparatus for computing the recognized value of the amount of the solar radiation in an automobile air-conditioning system, which apparatus performs on the recognized value, specifically the output value to a control device of the detected amount of the solar radiation, a different computation when the amount of the solar radiation is tending to increase than when the amount is tending to decrease so that the automobile occupants are enabled to enjoy the optimum sensation of the air conditioning.

2. Description of the Prior Art

In recent years, the advent of the automation of the control of the automobile air-conditioning system has given birth to the practice of providing an automobile with an ambient air sensor and a solar radiation sensor, for example, detecting the ambient condition enveloping the automobile based on the signals issued from these sensors, and maintaining the environment inside the automobile constantly in spite of a change in the ambient condition outside the automobile.

One example of the technique aimed at attaining comfortable air conditioning of the automobile interior by the detection of the ambient condition outside the automobile with the aid of an ambient air sensor and a solar radiation sensor is disclosed in U.S. Pat. No. 4,696,167. The technique which is disclosed in this patent specification is based on the feedback control due to the deviation of the interior temperature from the target temperature and consequently is enabled to effect an estimated control for satisfying the condition of thermal equilibrium set in advance in due consideration of the ambient air temperature and the amount of solar radiation. It aims to overcome the disadvantage of the conventional automobile air-conditioning system. To be specific, this technique presumes the automobile air-conditioning system and the automobile interior and the like to be controlled by the system as constituting themselves one integral control system and adapts this integral control system to respond very stably such as to a sudden change in the amount of solar radiation or the ambient air temperature or even to a disturbance due to a sharp change in the set temperature of the automobile interior. More specifically, the technique is directed to determining the optimum amount of feedback necessary for enabling the inner air temperature to coincide with the target temperature based on the set target temperature for the automobile interior and the inner air temperature and consequently controlling the various magnitudes of the inflowing air in accordance with the amount of feedback. By this technique, therefore, the fluctuation of the inner temperature can be minimized even when there occurs an abrupt change as in the amount of solar radiation, for example.

Incidentally, in the conventional automobile air-conditioning system embracing the technique mentioned above, the components of the air-conditioning system are controlled by detecting the amount of solar radiation with a solar radiation sensor, performing an arithmetic operation of integration on the detected amount of solar radiation, adopting the result of the arithmetic operation as a recognized value, and using this recognized value as one of the elements for control.

The specific arithmetic operation for deriving the recognized value from the value detected by the solar radiation sensor is carried out roughly as follows.

The amounts of solar radiation detected continually by the solar radiation sensor are subjected to A/D conversion at fixed sampling intervals. The digitized amounts of solar radiation resulting from the A/D conversion are integrated with a fixed time constant. The amounts of solar radiation resulting from this integration are destined to serve as the recognized values. These recognized values, therefore, vary curvilinearly along the course of the sampling intervals mentioned above. These recognized values are adopted as one of the elements for the control of the air-conditioning. The operations of the components of the air-conditioning system are controlled on the basis of these controlling elements.

In the conventional automobile air-conditioning system of this nature, however, since the time constant for the computation of recognized values is uniquely set, the variation of recognized values has an invariable characteristic when the amount of solar radiation is increasing and when the amount is decreasing. The characteristic of this variation has been heretofore set so that the operations of the components of the air-conditioning system are controlled with the optimum following characteristic rather with respect to the increase in the amount of solar radiation. Thus, the air conditioning can be controlled to match the human feeling during the increase in the amount of solar radiation. There are times, however, when the air-conditioning cannot be controlled to match the human feeling during the decrease in the amount of solar radiation.

As regards the feeling caused by the air conditioning on the human, when the amount of solar radiation increases suddenly, comfortable sensation of the air conditioning is attained by effecting a fast following control of the air-conditioning system in conformity with the increase within the range in which the control system is warranted to operate stably. Conversely, when the amount of solar radiation decreases suddenly, comfortable sensation of the air conditioning is attained by not effecting a very fast following control of the air-conditioning system. This trend characterizes the control of the air-conditioning system. This characteristic concerns the human feeling of the air conditioning and, therefore, is specifically expressed in numerical values only with extreme difficulty. The inventors' experiment on the human feeling of the air conditioning by the use of an actual automobile has it ascertained to them that the sensation of discomfort can be avoided by gradually varying the control of the air-conditioning control system in conformity with the decrease in the amount of solar radiation when the amount of solar radiation suddenly decreases as when an automobile cruising under the scorching sun enters a tunnel.

SUMMARY OF THE INVENTION

This invention, conceived in the urge to solve the various drawbacks of the prior art mentioned above, aims to provide an apparatus for computing the recognized value of the amount of solar radiation, which apparatus performs on the increase or decrease in the amount of solar radiation, a different computation of the recognized value when the amount of solar radiation increases than when the amount decreases and consequently enables the automobile occupants to enjoy a very satisfactory feeling of the air conditioning.

This invention contemplates controlling the air-conditioning system by discriminating whether the amounts of solar radiation being detected by solar radiation amount detecting means are on an upward trend or a downward trend and, when the trend is upward, computing recognized values necessary for the air conditioning in the automobile interior to follow the upward trend relatively quickly, and effecting the control of the air-conditioning system on the basis of the recognized values or, when the trend is downward, computing recognized values necessary for the air conditioning in the automobile interior not to follow the downward trend very quickly and effecting the control of the air-conditioning system on the basis of the recognized values.

As the result, the state of air conditioning in the automobile interior varies with a relatively quick response while the amount of solar radiation is increasing and in a relatively slow response while the amount of solar radiation is decreasing. The air conditioning to be controlled in this manner, therefore, enables the automobile occupants to enjoy a highly satisfactory and consequently comfortable sensation.

DETAILED DESCRIPTION OF THE INVENTION

Figure 1:
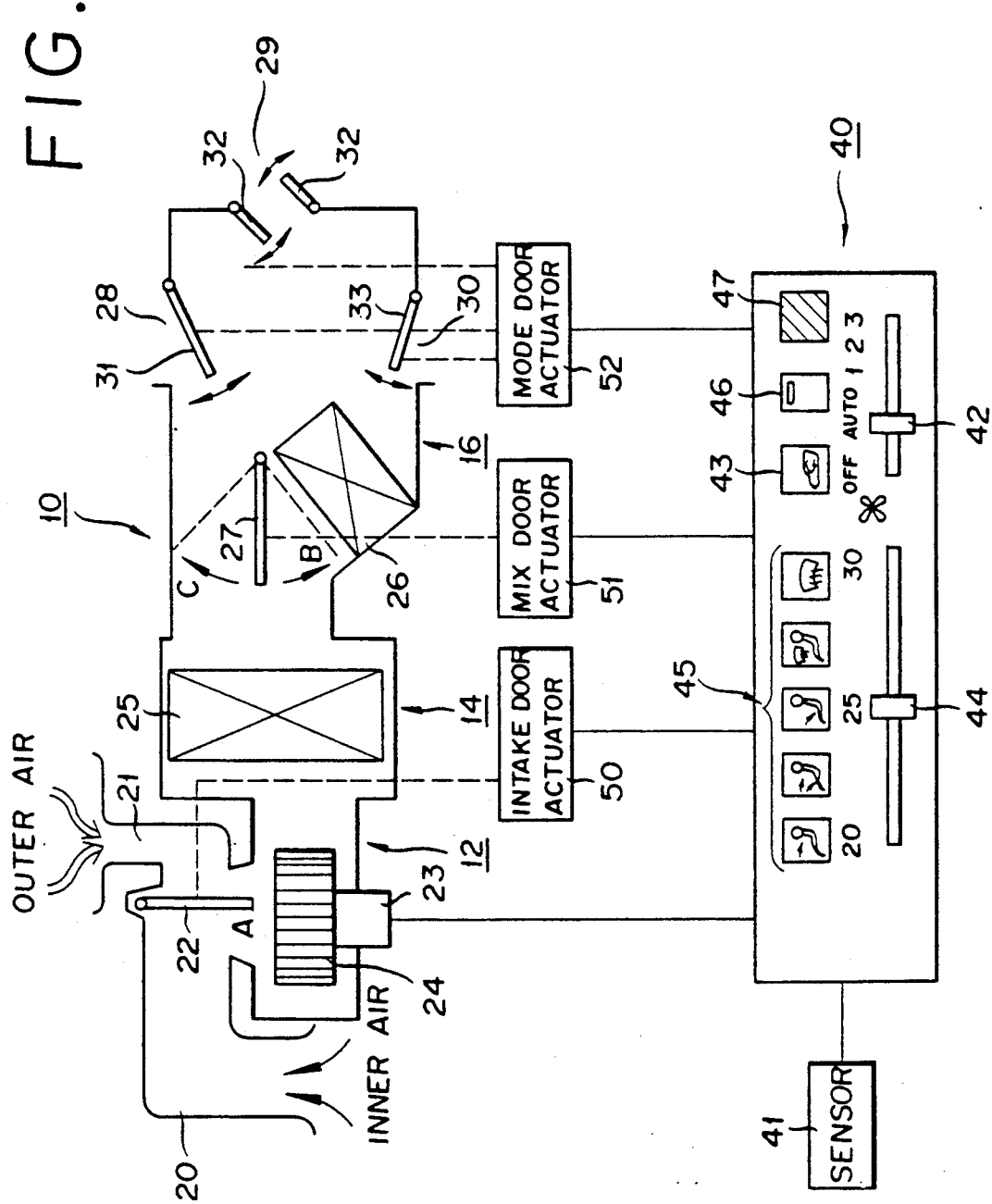
FIG. 1 is a schematic structural diagram of an automobile air-conditioning system provided with an apparatus for computing recognized values of the amount of solar radiation according to the present invention.

FIG. 1 is a schematic structural diagram illustrating an automobile air-conditioning system provided with the apparatus of this invention for the computation of recognized values of the amount of solar radiation. This system is configured as follows.

A main body 10 of the air-conditioning system for taking the air from the outside or the inside of an automobile interior, adjusting the temperature of the incoming air to a level desired by the automobile occupants, and blowing the air of the adjusted temperature into the automobile interior comprises an intake unit 12 for introducing the air outside or inside the automobile interior, a cooler unit 14 for cooling the incoming air, and a heater unit 16 for heating the air cooled by the cooler unit 14 to the temperature desired by the automobile occupants and blowing the air of the adjusted temperature into the automobile interior. These component units 12, 14, and 16 are connected in series as retained in an air-tight state as illustrated.

The intake unit 12 is provided with an inner air intake 20 for introducing the air from the automobile interior and an outer air intake 21 for introducing the air from the outside of the automobile. At the joint between the two air intakes 20, 21, an intake door 22 is fixed in such a manner as to be allowed to open and close the inlets to the two air intakes 20, 21. This intake door 22, therefore, serves the purpose of choosing between the inner and outer air to be taken into the automobile interior or deciding the ratio of the amounts of the inner and outer air to be taken in. On the downstream side of this intake door 22, a fan 24 rotated by a fan motor 23 is disposed. By the rotation of this fan 24, the inner and outer air selected by the intake door 22 is drawn in.

The cooler unit 14 is provided with an evaporator 25 for causing the air taken in by the fan 24 to be cooled by exchange of heat with a cooling medium supplied by a compressor (not shown). The air taken in by the fan 24 is cooled and also dehumidified by being passed through this evaporator 25.

The heater unit 16 is provided with a heater core 26 capable of causing the air cooled by passage through the evaporator 25 to be heated by exchange of heat with the cooling water for an engine (not shown) which is flowing in the interior thereof. On the upstream side of the heater core 26, a mix door 27 is set in place rotatably as illustrated and is adapted to determine, owing to the position of its rotation, the ratio of the volume of the air passing the heater core 26 to that of the air bypassing the heater core 26 and consequently adjust the temperature of the air blown into the automobile interior. On the downstream side of the heater core 26 and the mix door 27, there are installed a defrosting blow outlet 28 for blowing the air of adjusted temperature in the direction of the inner side of the windshield of the automobile, a vent blow outlet 29 for blowing the air of adjusted temperature into the automobile interior through a ventillator disposed in the central part of an instrument panel, and a foot blow outlet 30 for blowing the air of adjusted temperature in the direction of the feet of the occupants. The defrosting blow outlet 28, the vent blow outlet 29, and the foot blow outlet 30 are provided respectively with a defrosting door 31, a vent door 32, and a foot door 33. By the degrees of opening of these doors 31, 32, and 33, the volumes of the air of adjusted temperature to be blown to the prescribed positions inside the automobile interior are determined.

A controller 40 disposed inside the automobile interior incorporates therein a control circuit, to which is connected a sensor 41 adapted to detect the temperature of the inner and outer air and the amount of solar radiation. On the front side of this controller 40, there are installed a fan control lever 42 for choosing between the manual and automatic control of the fan 24 and, in the case of the manual control, issuing a signal for setting the number of rotations of the fan 24, an inner-outer air switch 43 for issuing a signal regarding the position for setting the intake door 22, a temperature control lever 44 for issuing a signal regarding the temperature at which the air inside the automobile interior is to be set, a mode switch 45 for issuing a signal for setting the mode of air conditioning, an air-conditioning switch 46 for issuing a signal for initiating the function of the air-conditioning system, and an air inlet 47 for guiding the air inside the automobile interior to an inner air sensor (not shown) for the detection of the temperature of the inner air of the automobile interior. The signals issued from these levers or switches are fed out to the control circuit mentioned above.

Further, to the controller 40 are connected an intake door actuator 50 for driving the intake door 22, a mix door actuator 51 for driving the mix door 27, and a mode door actuator 52 for synchronously driving the defrosting door 31, the vent door 32, and the foot door 33. In accordance with the detection signal of the sensor 41, the setting signal of the fan control lever 42, the setting signal of the inner-outer air switch 43, the temperature setting signal of the temperature control lever 44, and the mode setting signal of the mode switch 45, the control circuit operates the fan 24 at the prescribed number of rotations, setting the intake door 22 for supply of the inner or outer air with the aid of the intake door actuator 50, sets the mix door 27 at the prescribed degree of opening with the aid of the mix door actuator 51, and sets the prescribed mode of air conditioning with the aid of the mode door actuator 52.

When the fan control lever 42 is set for a low speed (1), for example, the setting signal is injected into the control circuit. In response, the control circuit sets the fan motor 23 rotating at a low speed and consequently causes the fan 24 to be rotated at the low speed. When the fan control lever 42 is set to the mark (AUTO) on the dial, the air-conditioning system is automatically controlled and the control circuit computes the optimum number of rotations of the fan 24 based on the detection signal of the sensor 41 and the temperature setting signal of the temperature control lever 44 and sets the fan 24 rotating at a speed fixed by the result of the computation. Similarly the control circuit, based on the detection signal of the sensor 41 and the temperature setting signal of the temperature control lever 44, optimally sets the degree of opening of the mix door 27 and the mode of air conditioning.

A total of five modes are used for the air conditioning; a VENT mode for blowing the air out of the vent blow outlet 29, a B/L (bilevel) mode for blowing relatively cold air out of the vent blow outlet 29 and relatively warm air out of the foot blow outlet 30, a FOOT mode for blowing the air out of the foot blow outlet 30, a D/F (defrost. foot) mode for blowing the air both out of the defrosting blow outlet 28 and the foot blow outlet 30, and a DEF mode for blowing the air solely out of the defrosting blow outlet 28. These air conditioning modes can be manually set selectively with the aid of the mode switch 45. Otherwise, they may be automatically set with the aid of the control circuit.

Figure 2:
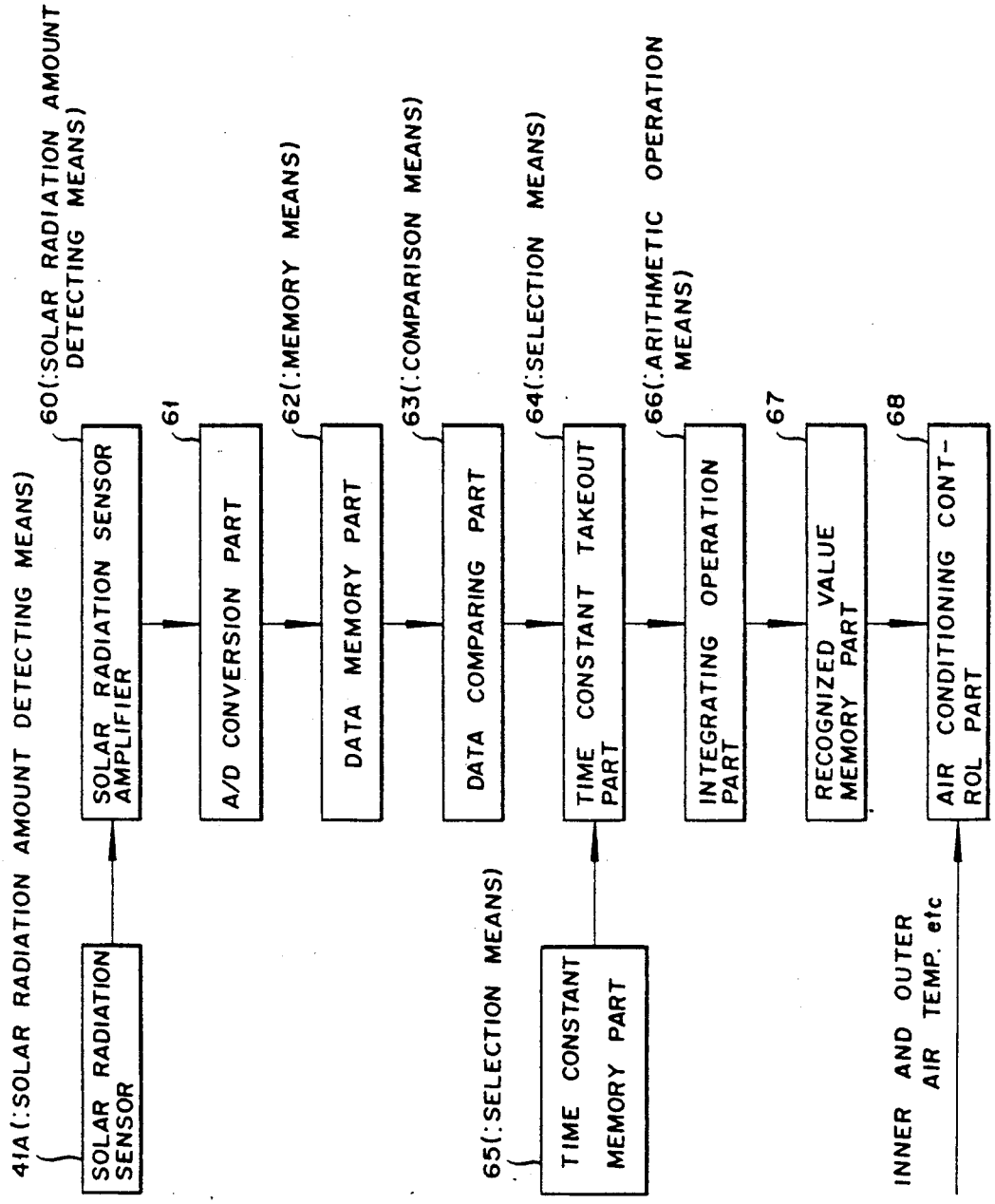
FIG. 2 is a block diagram schematically illustrating the construction of the apparatus of this invention for computing recognized values of the amount of solar radiation as incorporated in an automobile air-conditioning system.

FIG. 2 is a block diagram schematically illustrating the construction of the apparatus of this invention for computing recognized values of the amount of solar radiation as incorporated in an automobile air-solar conditioning system. This apparatus is disposed inside the controller.

The amount of solar radiation detected by a solar radiation sensor 41A, one of the components of the sensor 41, is amplified by a solar radiation sensor amplifier 60 and then fed out to an A/D conversion part 61. The A/D conversion part 61 digitally converts the amplified amount of solar radiation. A data memory part 62 stores the digital amount of solar radiation. The digital conversion of the amount of solar radiation by the A/D conversion part 61 is performed at prescribed sampling intervals. In the data memory part 62, the latest digital amount of solar radiation and the digital amount immediately preceding it are memorized. A data comparing part 63 reads the latest digital amount and the digital amount immediately preceding it out of the data memory part 62, compare the two amounts, and transfers the result of this comparison to a time constant takeout part 64. In the data comparing part 63, a decision is made as to whether the amount of solar radiation is on the upward trend or on the downward trend. To be more specific, the data comparing part 63 compares the latest amount of solar radiation and the amount of solar radiation immediately preceding it and concludes that the amount of solar radiation is on the upward trend when the latest amount of solar radiation is larger than the amount of solar radiation immediately preceding it or that the amount of solar radiation is on the downward trend when the result of the comparison is reversed. The time constant takeout part 64, in accordance with the result of the comparison mentioned above, selects a time constant for the computation of the recognized value of the amount of solar radiation memorized in a time constant memory part 65. The time constant memory part 65 has two time constants stored therein; a larger time constant to be selected when the amount of solar radiation is on the upward trend and a relatively small time constant to be selected when the amount of solar radiation is on the downward trend. An integrating operation part 66 performs the operation of integration on the latest amount of solar radiation memorized in the data memory part 62 with the time constant selected from the time constant memory part 65 by the time constant takeout part 64. Then, the result of this operation is memorized as a recognized value in a recognized value memory part 67. Based on the recognized value and other control elements, an air conditioning control part 68 effects the control of the air conditioning. The term "recognized value" as used herein refers to the amount of control regarding the amount of solar radiation to be used in actually effecting the control of the air conditioning. The amount of control by nature varies every moment.

Figure 3:
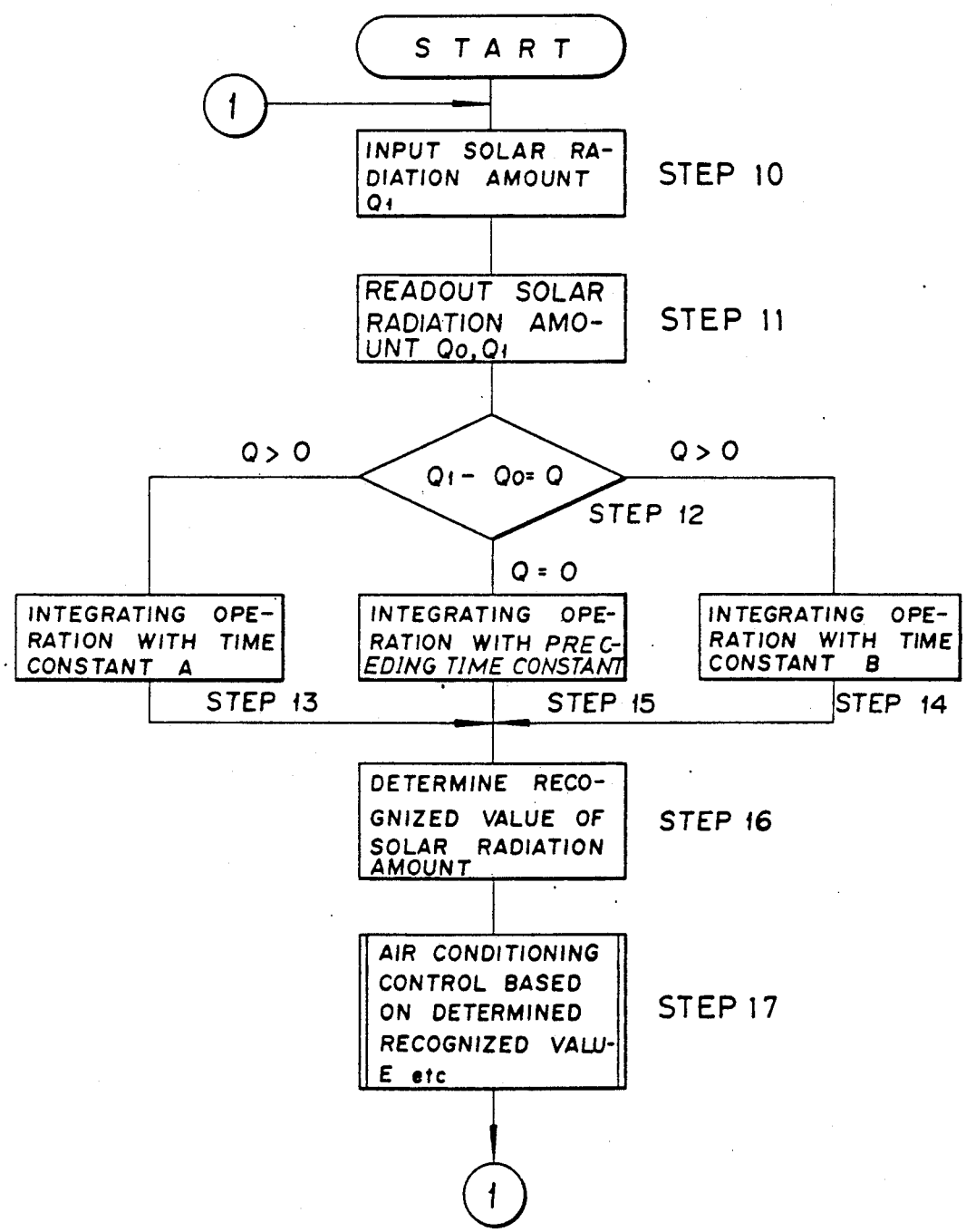
FIG. 3 is a flow chart illustrating the operation of the apparatus illustrated in FIG. 2.

Now, the operation of the apparatus of this invention for computing the recognized value of the amount of solar radiation will be explained on the basis of the flow chart illustrated in FIG. 3, with reference to the diagrams of FIG. 4 and FIG. 5.

First, the latest amount of solar radiation, $Q_1$, detected by the solar radiation sensor 41A is amplified by the solar radiation sensor amplifier 60, digitized by the A/D conversion part 61, and memorized at a stated address in the data memory part 62. The amount of solar radiation to be memorized in this case is the amount of solar radiation at the point $T_1$, for example, on the time axis as illustrated in FIG. 4 and FIG. 5 (Step 10). Then, the data comparison part 63 reads out of the data memory part 62 the latest amount of solar radiation, $Q_1$, and the amount of solar radiation, $Q_0$, immediately preceding it (the amount of solar radiation at the point, $T_0$, on the time axis illustrated in FIG. 4 and FIG. 5) (Step 11) and executes a decision by comparing these two amounts, $Q_0$ and $Q_1$, of solar radiation (Step 12). When the decision is that the amount of solar radiation, $Q_1$, is larger than the amount of solar radiation, $Q_0$, namely that the amount of solar radiation is on the upward trend, the time constant takeout part 64 takes out of the time constant memory part 65 a time constant A to be used when the amount of solar radiation is on the upward trend and feeds this time constant A to the integrating operation part 66. This time constant A is empirically set at a relatively small value (such as, for example, about 30 seconds) on account of the necessity for enhancing the following property to be exhibited with respect to the feeling of air conditioning which varies with the increase in the amount of solar radiation (Step 13). Conversely, when the decision is that the amount of solar radiation, $Q_1$, is smaller than the amount of solar radiation, $Q_0$, namely that the amount of solar radiation is on the downward trend, the time constant takeout part 64 takes out of the time constant memory part 65 a tine constant B to be used when the amount of solar radiation is on the downward trend and feeds this time constant B to the integrating operation part 66. This time constant B is empirically set at a relatively large value (such as, for example, about 60 seconds) so that the following property with respect to the decrease in the amount of solar radiation is not improved very much (Step 14). When the decision is that the amount of solar radiation, $Q_1$, and the amount of solar radiation, $Q_0$, are equal, namely that absolutely no change occurs in the amount of solar radiation during the sampling intervals of the treatment of Step 10, the time constant used in the integrating operation during the preceding sampling interval is fed out once more to the integrating operation part 66 (Step 15). The integrating operation part 66 performs the operation of integration on the recognized values of the amount of solar radiation based on the time constant supplied from the time constant takeout part 64 until the next sampling is carried out. Then, the result of this operation is memorized as a renewed value in the recognized value memory part 67. Specifically in this step, when the amount of solar radiation is on the upward trend, the calculation of adding to the recognized values computed so far the products of the differences between the values of the amount of solar radiation detected and the recognized values computed so far multiplied by 1/32 is repeated at intervals of 100 ms. When the amount of solar radiation is on the downward trend, the calculation of subtracting from the recognized values computed so far the products of the differences between the values of the amount of solar radiation detected and the recognized values computed so far multiplied by 1/64 is repeated at intervals of 100 ms (Step 16). The air conditioning control part 68 effects the control of the air conditioning on the basis of the recognized values computed as described above and the other control elements, i.e. the detection signals of the sensor 41 other than the solar radiation sensor 41A and the temperature setting signals of the temperature control lever 44 (Step 17).

Figure 4:
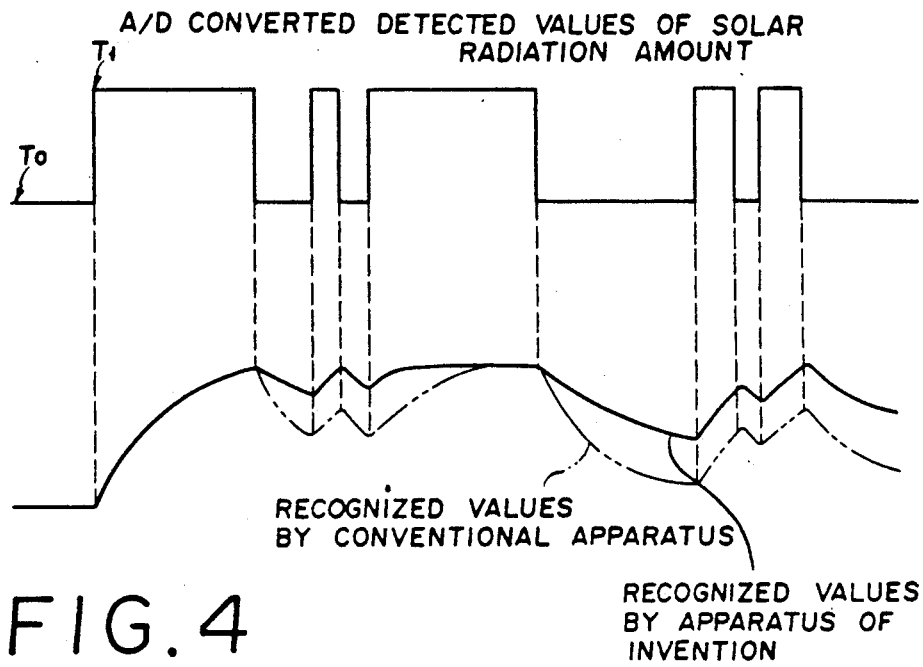
FIG. 4 is a diagram illustrating the detected values of the amount of solar radiation varying within a fixed range obtained in consequence of A/D conversion and the recognized values to be consequently computed by the conventional apparatus as compared with those to be consequently computed by the apparatus of the present invention.
Figure 5:
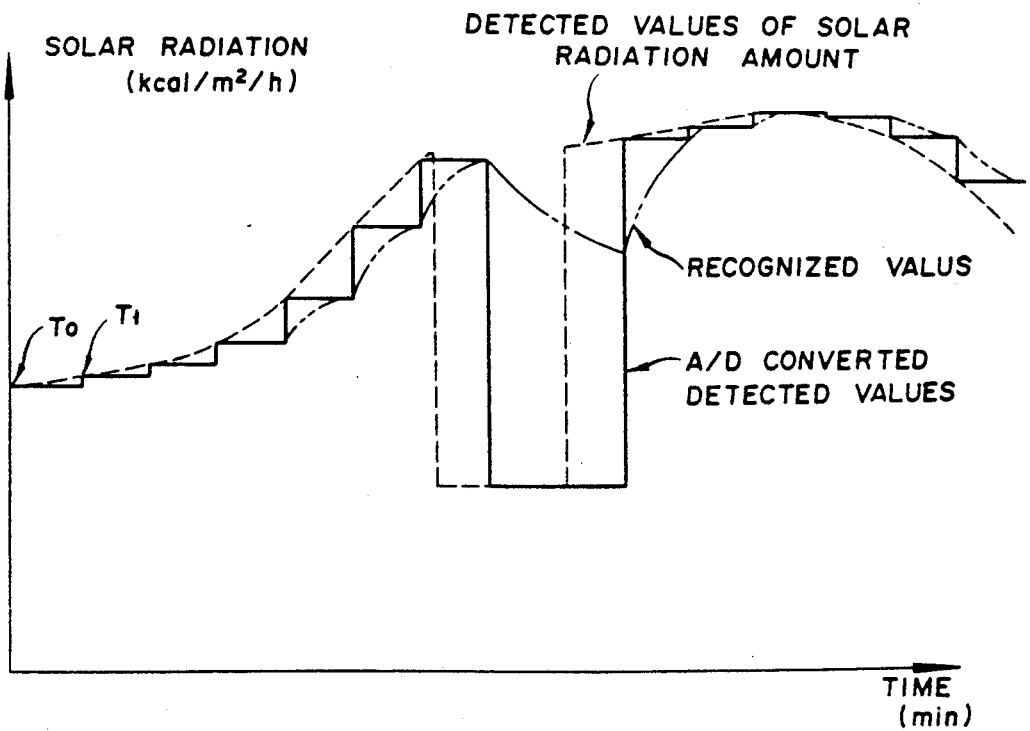
FIG. 5 is a diagram illustrating the detected values of the amount of solar radiation of model variation obtained in consequence of A/D conversion and the recognized values to be consequently computed by the apparatus of the present invention.

The apparatus of this invention for computing the recognized values of the amount of solar radiation which operates as described above computes the recognized values as illustrated in FIG. 4 and FIG. 5 when the amount of solar radiation varies as illustrated therein.

When the A/D converted detected values of the amount of solar radiation are varied as illustrated in FIG. 4, the recognized values vary with a curve of relatively large inclination so as to follow the rise of the detected values and the recognized values vary with a gentle curve to follow the fall of the detected values, as indicated by the solid line in the diagram. In this diagram, the recognized values to be computed by the conventional apparatus are additionally illustrated. It is clearly noted from the diagram that the ratio of variation in the recognized values obtained by the apparatus of this invention during the fall of the detected values is significantly small as compared with those obtained by the conventional apparatus.

FIG. 4, for the purpose of facilitating the comprehension of this invention, illustrates the state in which recognized values vary when the amount of solar radiation varies between two levels. Actually, the amount of solar radiation varies in a very complicated pattern as illustrated in FIG. 5, for example.

In FIG. 5, the amount of solar radiation detected by the solar radiation sensor 41A is indicated by a dotted line. The sharp dip in the curve of the dotted line presumably represents the travel of the automobile in a tunnel. In the diagram, the solid line of variation consists of rectangular increments and represents A/D converted detected values of the amount of solar radiation and the two-dot one-dash line of discontinuous variation represents recognized values obtained by the computation performed on the A/D converted detected values of the amount of solar radiation. In this diagram, the sampling intervals for A/D conversion are extremely elongated from the actual one to aid in the comprehension of the concept underlying the present invention.

It is clearly noted from this diagram that in the region in which the amount of solar radiation has a small upward variation, the recognized values reach the A/D converted amounts of solar radiation rather rapidly and the ratio of variation of the recognized values increases in proportion as the variation grows in sharpness. When the automobile enters a tunnel and consequently the amount of solar radiation decreases instantaneously, the degree with which the recognized values decrease is slight as compared with the ratio of variation in the detected values of the amount of solar radiation as illustrated. When the automobile emerges from the tunnel and consequently the detected values of the amount of solar radiation instantaneously increase, the recognized values rise more rapidly than when the detected values of the amount of solar radiation fall as illustrated in the diagram. In the region in which the amount of solar radiation has a small downward variation, the degree with which the recognized values decrease is slight more conspicuously as compared with the degree of the actual decrease in the amount of solar radiation. Thus, the recognized values vary so as to follow the variation in the amount of solar radiation while the amount of solar radiation is on the upward trend and the degree with which the recognized values follow the variation in the amount of solar radiation is slight when the amount of solar radiation is on the downward trend than when it is on the upward trend. As the result, even when the amount of solar radiation varies suddenly, the automobile occupants continue to enjoy a highly satisfactory sensation of the air conditioning without experiencing the heretofore inevitable impairment of feeling.

In the embodiment described above, the recognized values have been depicted as varying curvilinearly in accordance with the variation in the amount of solar radiation. This invention, however, is not limited to the recognized values which vary in this mode. For example, the recognized values may be such that they vary with a linear inclination conforming to the ratio of variation in the amount of solar radiation. Even in this case, it is only natural that the ratio of variation in the recognized values during the upward trend of detected values should be set at a higher level than that during the downward trend of the detected values. The recognized values may be varied curvilinearly during the upward trend of the amount of solar radiation and linearly during the downward trend thereof or vice versa on the condition that the ratios of variation in the recognized values during the upward trend and the downward trend of the detected values vary as described above.

What is claimed is:

1. An apparatus for computing recognized values of the amount of solar radiation in an automobile air-conditioning system, which apparatus effects said computation of the recognized values of the amount of solar radiation by performing the operation of integration on the amount of solar radiation impinging on an automobile and which apparatus comprises solar radiation amount detecting means for detecting the amount of solar radiation impinging on said automobile; solar radiation amount memory means for chronologically memorizing the amounts of solar radiation detected by said solar radiation amount detecting means; comparison means for reading out of said memory means the latest amount of solar radiation and the amount of solar radiation immediately preceding it among other amounts of solar radiation memorized in said memory means and comparing said two amounts of solar radiation; integrating operation coefficient memory means for memorizing a plurality of integrating operation coefficients for use in the operation of integration; and arithmetic operation means for selecting the optimum integrating operation coefficient from among those stored in said integrating operation coefficient memory means in accordance with the result of comparison performed by said comparison means and performing an operation of integration using the selected integrating operation coefficient on the latest amount of solar radiation memorized in said memory means thereby determining a recognized value and means applying said recognized value to said air-conditioning system.

2. An apparatus according to claim 1, wherein said solar radiation amount memory means incorporates therein A/D conversion means for sampling amounts of solar radiation detected by said solar radiation detection means at fixed sampling intervals and digitizing the sampled amounts of solar radiation and functions to memorize therein the latest amount of solar radiation and the amount of solar radiation immediately preceding it which have undergone the conversion performed by said A/D conversion means.

3. An apparatus according to claim 1, wherein said comparison means forms a decision that the amount of solar radiation is on the upward trend when said latest amount of solar radiation memorized is greater than said amount of solar radiation immediately preceding it or that the amount of solar radiation is on the downward trend when said latest amount of solar radiation memorized is smaller than said amount of solar radiation immediately preceding it.

4. An apparatus according to claim 1, wherein said integrating operation memory means has memorized therein a relatively small time constant to be selected when said comparison means forms a decision that the amount of solar radiation is on the upward trend and a relatively large time constant to be selected when said comparison means forms a decision that the amount of solar radiation is on the downward trend.

5. An apparatus according to claim 1, wherein said arithmetic operation means selects said relatively small time constant from among the time constants memorized in said integrating operation memory means when said comparison means forms a decision that the amount of solar radiation is on the upward trend or said relatively large time constant from said time constants memorized in said integrating operation memory means when said comparison means forms a decision that the amount of solar radiation is on the downward trend and performs a computation of a recognized value on the basis of the selected time constant.

* * * * *

UNITED STATES PATENT AND TRADEMARK OFFICE
CERTIFICATE OF CORRECTION

PATENT NO. : 5,031,830
DATED : July 16, 1991
INVENTOR(S) : Kou Ogino, Kouji Murayama and John Petersdorf It is certified that error appears in the above-identified patent and that said Letters Patent is hereby corrected as shown below:

Drawings, Sheet 4, Fig. 5, middle right hand side of drawing; "VALUS"
    should read -- VALUES --
Col. 5, line 56; delete "solar"
Col. 6, line 25; "upward" should read -- downward --
Col. 6, line 27; "downward" should read -- upward --
Col. 7, line 12; "tine" should read -- time --
Col. 8, line 43; "slight" should read -- small --
Col. 8, line 44; delete "more conspicuously"
Col. 8, line 47; "while" should read -- when --
Col. 8, line 48; after "trend" insert a comma -- , --
Col. 8, line 50; "slight" should read -- small --
Col. 8, line 52; "than" should read -- compared to --
Col. 8, line 52; "the" (second occurrence) should read -- a --

Signed and Sealed this

Sixteenth Day of March, 1993

Attest:

STEPHEN G. KUNIN

Attesting Officer   Acting Commissioner of Patents and Trademarks